United States Patent
Nozaki et al.

(10) Patent No.: US 6,305,125 B1
(45) Date of Patent: *Oct. 23, 2001

(54) WINDOW GUIDE HAVING A PLURALITY OF CONTACT MEMBERS ATTACHED AT ONLY ONE END FOR GUIDING AN AUTOMOBILE DOOR WINDOW

(75) Inventors: Masahiro Nozaki, Tsushima; Katsunori Kawai, Aichi-ken, both of (JP)

(73) Assignee: Toyoda Gosei Co., Ltd., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,170

(22) Filed: Dec. 28, 1998

Related U.S. Application Data

(63) Continuation-in-part of application No. 08/728,383, filed on Oct. 9, 1996, now abandoned.

(30) Foreign Application Priority Data

| Oct. 9, 1995 | (JP) | 7-287910 |
| Dec. 8, 1995 | (JP) | 7-345817 |

(51) Int. Cl.[7] .............................. E05D 15/16; E06B 7/22
(52) U.S. Cl. ................................ 49/416; 49/415; 49/419; 49/428
(58) Field of Search ............................ 49/415, 414, 416, 49/419, 441, 428

(56) References Cited

U.S. PATENT DOCUMENTS

| 515,054 | * | 2/1894 | Norcross | 49/441 |
| 603,783 | * | 5/1898 | Denham | 49/428 |
| 1,502,644 | * | 7/1924 | Campbell | 49/428 |
| 1,582,506 | * | 4/1926 | Bridgwood | 49/211 |
| 1,760,226 | * | 5/1930 | Appleby | 49/428 |
| 1,865,259 | * | 6/1932 | Keller | 49/441 |
| 1,927,651 | | 9/1933 | Reid . | |
| 2,132,104 | * | 10/1938 | Froeliger | 49/415 |
| 2,283,009 | * | 5/1942 | Levan | 49/415 |
| 2,476,947 | * | 7/1949 | Schunk | 49/414 |
| 3,131,439 | | 5/1964 | Wilfert . | |
| 3,385,000 | | 5/1968 | Sturtevant et al. . | |
| 3,514,903 | * | 6/1970 | Roche | 49/416 |
| 4,417,419 | | 11/1983 | Rossie et al . | |
| 4,593,494 | | 6/1986 | Ono et al. . | |
| 5,267,415 | | 12/1993 | Vaughan . | |
| 5,771,637 | * | 6/1998 | Oikawa et al. | 49/416 |
| 5,943,823 | * | 8/1999 | Yoshida et al. | 49/416 |

FOREIGN PATENT DOCUMENTS

| 385855 | * | 9/1990 | (EP) | 49/436 |
| 580387 | * | 11/1957 | (IT) | 49/441 |
| 59-102867 | | 7/1984 | (JP) . | |
| 7-237509A | | 9/1995 | (JP) . | |
| 9100676 | | 4/1997 | (JP) . | |
| 9156373 | | 6/1997 | (JP) . | |

* cited by examiner

Primary Examiner—Blair M. Johnson
Assistant Examiner—Gregory J. Strimbu
(74) Attorney, Agent, or Firm—Pillsbury Winthrop LLP

(57) ABSTRACT

A window guide assembly for an automobile window includes at least one guide portion provided in the main body of an automobile door for guiding movement of the window, and also includes a plurality of contact members provided on opposing portions of the guide portion. The contact members are arranged to oppose the window so that the contact members slidably contact the inner and outer surfaces of the side edge of the window. The guide portion is constituted by a lower sash provided in the main body of the door. The contact members, provided on at least one side of the opposing portions, are elastic. The contact members are claw-shaped, in approximately the form of a C-shaped cross-section, and only one end of the C-shaped cross section of each of the claw-shaped members is fixed to the lower sash. Further, the contact members may be removably fixed by mounting the contact members in mounting portions of the lower sash.

21 Claims, 10 Drawing Sheets

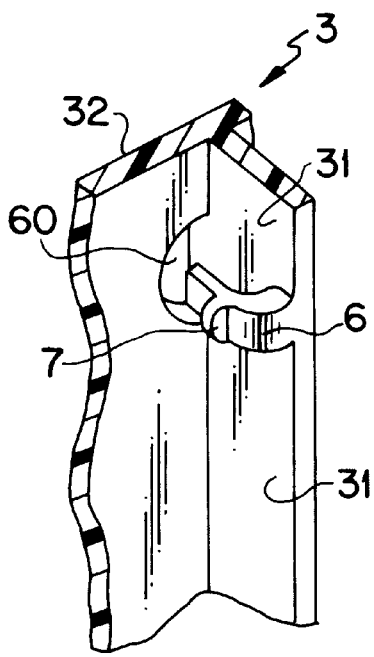
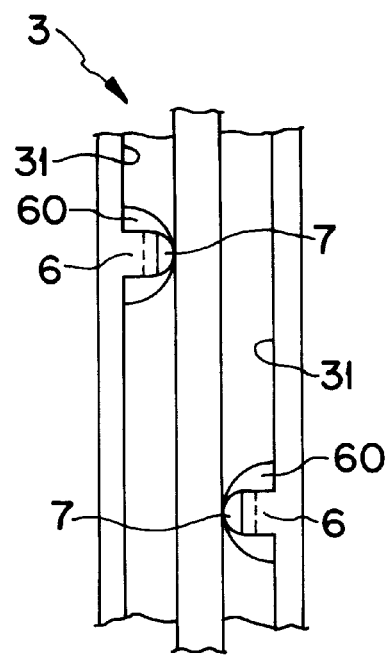
FIG. 3A  FIG. 3B
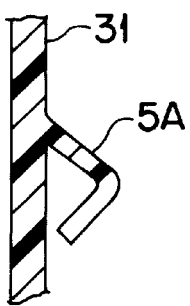
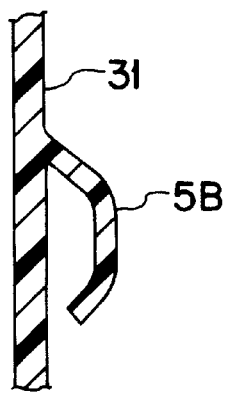
FIG. 4A  FIG. 4B

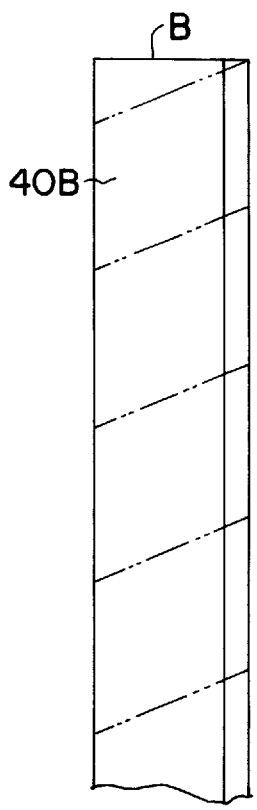
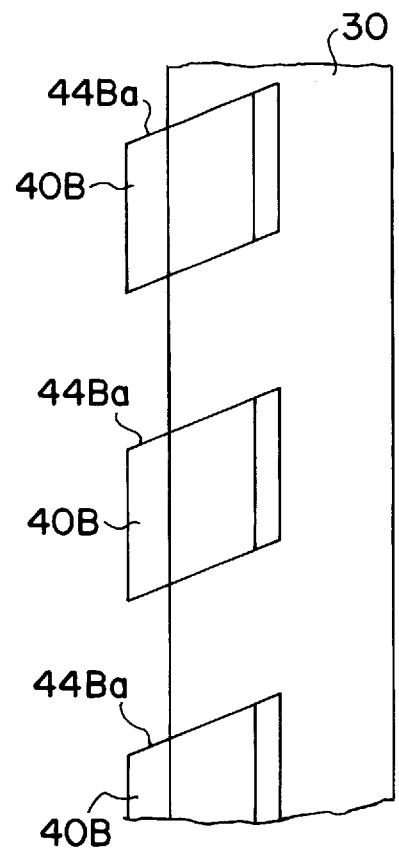
FIG. 11A  FIG. 11B
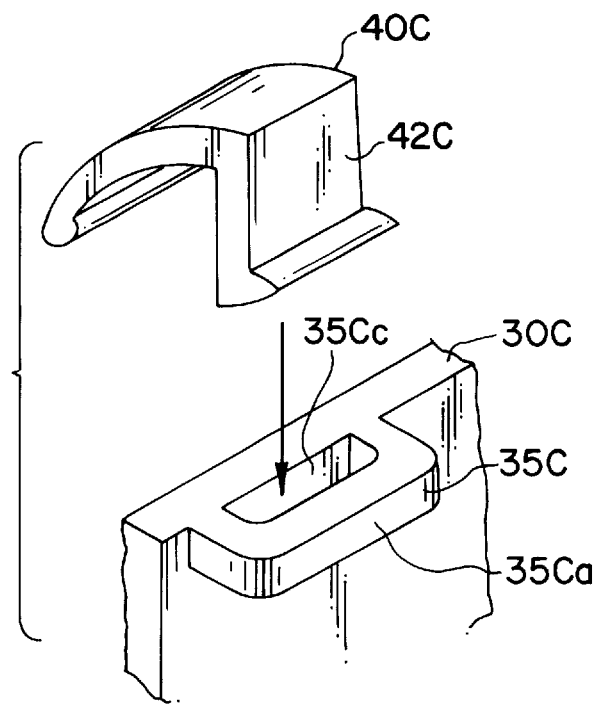
FIG. 12

WINDOW GUIDE HAVING A PLURALITY OF CONTACT MEMBERS ATTACHED AT ONLY ONE END FOR GUIDING AN AUTOMOBILE DOOR WINDOW

RELATED APPLICATIONS

This application is a continuation-in-part of U.S. Ser. No. 08/728,383 filed Oct. 9, 1996 (now abandoned), the contents of which are hereby incorporated by reference into the present application.

BACKGROUND OF THE INVENTION

1. Field of the Invention

The present invention relates to a window guide structure, or sash such as in an automobile door for any type of sliding window. More particularly, in the present invention the sash guides movement of the window, including the ascent and descent of the window, in the main body of the door or any other location of a window so that the window can slide along the sash.

2. Description of the Related Art

As shown in FIG. 14, sashes 103 are respectively provided at front and rear positions of door panel 101 of an automobile. Each of the sashes 103 is interposed between the inner and outer panels of the main body of the door panel 101. The sashes 103 guide the front and rear ends of a door window 102 when the door window 102 ascends or descends. These sashes 103 are disposed below the belt line of the door and are referred to as lower sashes. Following the glass run of the upper portion of the door panel 101, the lower sashes guide the front and rear ends of the window 102 when the window 102 is opened or closed.

Metal sashes have hitherto been employed and a glass run has been mounted on the metal sash. Sashes made of synthetic resin consisting of polyamide or polyacetal also have recently been employed to reduce the weight of the automobile and reduce costs.

For sashes made of synthetic resin, in order to omit the glass run, ensure the sliding property of the ascending or descending window 102, and prevent rattling of the window 102, protrusions 104 are provided, as shown in FIG. 15. The protrusions 104 extend from inner opposing surfaces 131 of the sash 103 and have U-shaped cross-sections. The protrusions 104 are positioned in opposing relationship at the opposing surfaces 131 (see FIG. 15), or can be positioned in alternating relationship in the longitudinal direction of the sash 103, as disclosed in Japanese Utility Model Unexamined Publication No. 59-102867. However, because synthetic resin is greater in thermal expansion and shrinkage than metal, there is the need to provide sufficient space between the window surface and the protrusion 104, and consequently, rattling of the window 102 cannot be prevented sufficiently.

The lower sash according to prior art has a guide portion such as the one shown in a perspective view in FIG. 16. The guide portion 100 of this lower sash is provided with a resin base 112 and a plurality of guide pieces 114 extending outwardly from the resin base 112. The guide pieces 114 are spaced in two rows by a distance slightly wider than the thickness of the window 102, and the window 102 slides between the spaced guide pieces 114.

In the above guide portion 100, however, vibration of the window 102, such as when travelling on a rough road, sometimes causes striking sounds to occur between the window 100 and the guide pieces 114. Also, sliding of the window 102 along the guide pieces 114 also sometimes produces sounds between the window 102 and the guide pieces 114.

Another conventional lower sash is disclosed in Japanese Patent Unexamined Publication No. 7-257510. FIG. 17 is a perspective view showing this lower sash 120. The lower sash 120 is provided with a metallic lower sash main body 122 in the form of a U-shaped cross-section and lip portions 124 mounted on the top ends of the sidewalls 122a of the lower sash main body 122. The lip portions 124 are formed over the overall length of the main body 122 of the lower sash. The lip portions 124 are bonded to the main body 122 by using an adhesive or are fixed by a clamp. In this lower sash 120 the window 102 slides between both lip portions 124.

In the lower sash 120, however, because the main body 122 thereof is formed of metal material, the attachment of the lip portions 124 to the main body 122 must be performed with an adhesive or the like and therefore the operation is troublesome. In addition, there has been the demand for reducing the quantity of material, such as rubber or resin, in the lip portions 124 themselves to reduce production cost.

SUMMARY OF THE INVENTION

The present invention has been made in order to solve the aforementioned problems found in the prior art, and accordingly, an object of the present invention is to provide a window guide structure that prevents rattling of the window in spite of temperature change or road conditions.

To achieve the above object, a guide structure according to the present invention includes a guide portion, provided in the main body of an automobile door, for guiding movement of the window. The guide structure also includes a plurality of control members provided on opposing surfaces of the guide portion so that each such member is in contact with the window. The contact members, provided on at least one of the surfaces, are formed so as to have elasticity.

Because thermal expansion and shrinkage can be absorbed by these elastic contact members, a plurality of contact members can preferably be brought into contact against opposite sides of the window so that no rattling of the window occurs.

The elastic contact members may be protrusions provided on at least one of the opposing surfaces of the guide portion. The contact members also may be formed as a plurality of claw-shaped members having approximately C-shaped cross-sections, so that a proximal end is coupled to a guide portion surface and the distal end is laterally spaced from the guide portion surface to allow flexible movement of the distal end of the contact member. The claw-shaped members may be disposed at predetermined intervals in a longitudinal direction of the sash.

In addition, the contacting portion of the claw-shaped member in sliding contact with the window may have a protruding portion designed to reduce the contact area between the contact member and the window and thereby reduce the sliding resistance.

Another object of the present invention is to provide a guide structure which is easily attached to the door glass and which is capable of reducing the quantity of material, such as rubber or resin, used in the contact member.

To achieve the above objects, the guide structure of an automobile window includes a sash with a groove. The sash is disposed inside a door panel of an automobile door and below a belt line so as to receive a sliding window. The sash includes a sash main body having a base portion and laterally spaced side wall portions extending from both sides of the base portion. The base portion and the side wall portions form the groove. The sash further includes a plurality of mounting portions formed in the side wall portions of the sash main body and a plurality of contact members mounted in the plurality of mounting portions. Each contact member has a surface for contacting the sliding the door glass, and the sliding surface is directed toward the groove to permit smooth sliding of the window. Therefore, no vibrating sound occurs and no sound occurs while sliding the window. In addition, a plurality of contact members are individually mounted in the mounting portion and are not provided over the overall length of the main body of the sash, so that the quantity of material can be reduced.

Furthermore, in a modified embodiment, a tapered surface is provided on the upper end portion of each contact member. This tapered surface alleviates the contact force between the contact member and the lower end portion of the window when the window descends. Therefore, when the contact member is attached to the mounting portion, the strength of attachment does not need to be increased and therefore the attaching operation becomes easy.

BRIEF DESCRIPTION OF THE DRAWINGS

The above and other objects and advantages will become apparent from the following detailed description when read in conjunction with the accompanying drawings, in which:

FIG. 3A is a perspective partial sectional view of a window guide sash according to a third embodiment of the present invention;

FIG. 3B is a side elevation view taken from the opening of the sash of FIG. 3A;

FIG. 4A is a sectioned view showing a variation of the claw-shaped protrusion according to a fourth embodiment of the present invention;

FIG. 4B is a sectioned view showing another variation of the claw-shaped protrusion according to a fifth embodiment of the present invention;

FIGS. 11A and 11B are diagrams used for explaining a variation of the guide piece of the guide structure shown in FIG. 6. FIG. 11A shows an extrusion molding before the molding is cut into guide pieces, and FIG. 11B shows the guide pieces after cutting;

FIG. 12 is a perspective view showing a variation of the guide structure shown in FIG. 6;

FIG. 13A is a perspective view of the sash main body and FIG. 13B is a perspective view of the guide piece;

DETAILED DESCRIPTION OF THE PREFERRED EMBODIMENTS

Preferred embodiments according to the present invention will hereinafter be described with reference to the drawings.

Figure 1A:
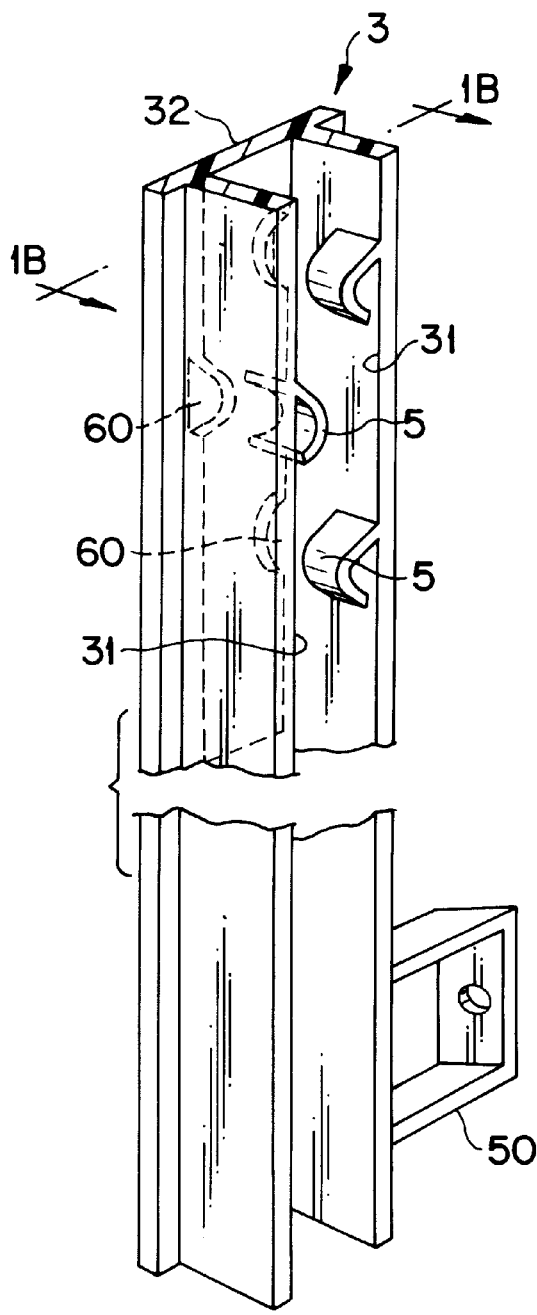
FIG. 1A is a perspective, partial sectional view of a window guide structure according to a first embodiment of the present invention.
Figure 1B:
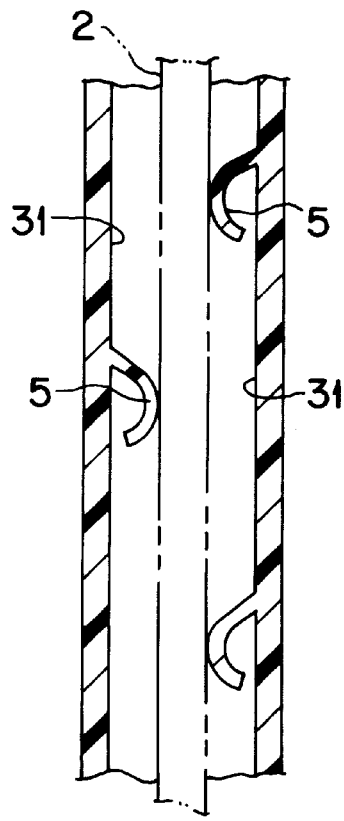
FIG. 1B is a sectioned longitudinal view taken substantially along line 1B—1B of FIG. 1A.

Shown in FIGS. 1A and 1B is a window guide structure, or sash, of an automobile in accordance with a first embodiment of the present invention. The sash is generally designated by reference numeral 3, has inner opposing surfaces 31 and base wall 32, and is made of a synthetic resin. The sash 3 formed from a synthetic resin is provided in the main body of the door. A plurality of contact members in the form of claw-shaped members 5 are formed from a synthetic resin and are spaced at predetermined intervals in the longitudinal direction of the sash 3.

In such a structure, the claw-shaped members 5 contact both surfaces of the window 2. The members 5 absorb thermal expansion or shrinkage by their flexibility, thereby preventing rattling of the window 2.

In addition, as shown in FIGS. 3A and 3B, according to a third embodiment of the present invention, a small protrusion 7 is formed on each of the window contacting portions of the claw-shaped members 6. The claw-shaped members 6 are in the form of the letter L where one end only is coupled to the inner opposing surface 31 of the sash 3.

With such a structure, the contact area between the window 2 and the sash 3 becomes small and the sliding friction of the window 2 is therefore reduced.

Figure 14:
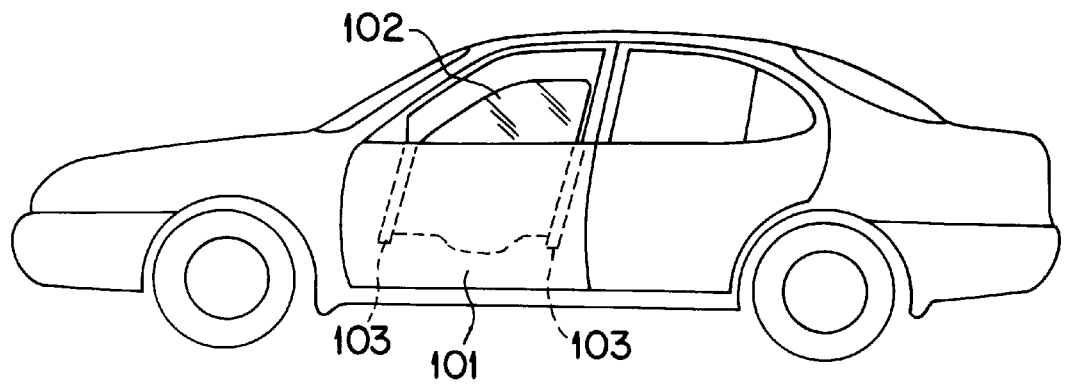
FIG. 14 is a side elevation view of an automobile provided with a prior art window guide sash.
Figure 15:
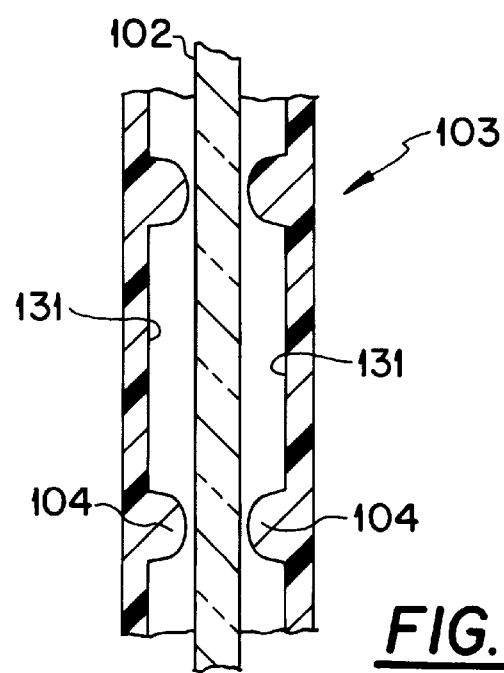
FIG. 15 is a sectioned longitudinal view of a conventional automobile door window guide sash.
Figure 16:
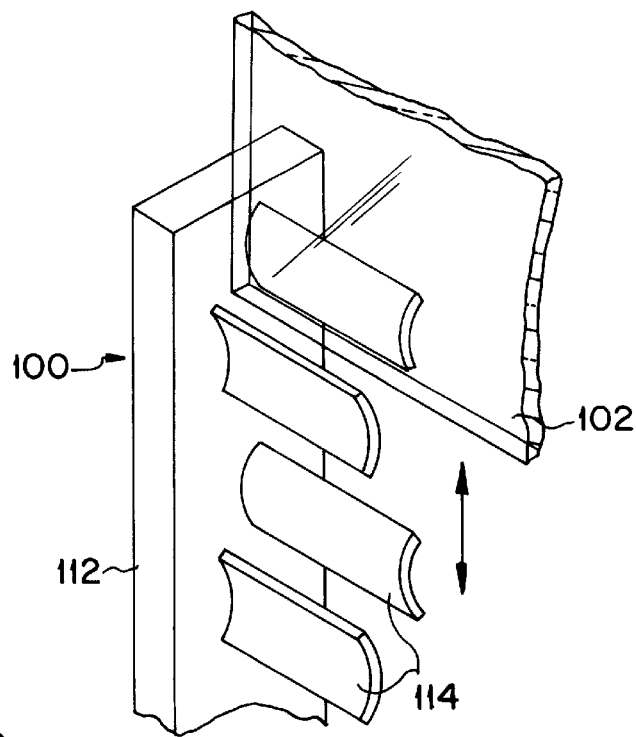
FIG. 16 is a perspective view of the guide portion of the conventional sash.
Figure 17:
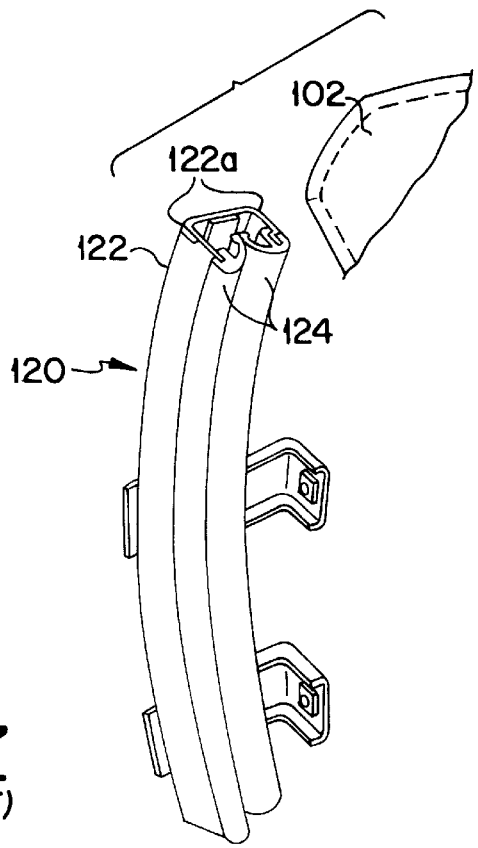
FIG. 17 is a perspective view of another conventional guide structure.

As shown in FIG. 14, in the main body 1 of the automobile door, front and rear sashes are installed in the longitudinal direction to guide the movement of the front and rear edges of the window, respectively.

The front and rear sashes 3 are approximately symmetrical in shape, and each sash is formed by injection molding and is made of synthetic resin. As an example, the front sash 3 has approximately a U-shaped cross-section as shown in FIGS. 1A and 1B. The front sash 3 is provided with a bracket 50 at the outer surface of one of the side walls. The front sash 3 is fixed to the inner panel of the door's main body 101 via the bracket 50.

On the inner opposing surfaces 31 of the sash 3 the plurality of claw-shaped members 5 are formed at predetermined intervals in the longitudinal direction of the sash, and the claw-shaped members 5 on both opposed surfaces 31 are alternately disposed, in an offset manner. Each claw-shaped member 5 has a substantially C-shaped cross-section. The upper end of the member 5 is coupled integrally, i.e., monolithically, with the surface 31, and the lower end is laterally spaced from the surface 31. The member 5 is flexible and is thinner in thickness than the side wall of the sash. Thus, the member 5 is formed into a shape having elasticity.

The spacing in the width direction between the top faces of the claw-shaped members 5 on both surfaces 31 is set so that the top faces can make contact with both surfaces of the window 2 when the window moves up and down therebetween. Holes 60 existing in the bottom surface 32 of the sash 3 at positions corresponding to the members 5 are holes through which sliding pins for forming the members 5 are removed when the sash 3 is injection-molded.

In the sash 3 constructed as described above, the window 2 moves up and down while opposite surfaces of the front edge of the window 2 slide on the curved top faces of the claw-shaped members 5 on respective surfaces 31. Therefore, no rattling of the window 2 occurs. The sash 3, including the contact members or claw-shaped members 5, expands or shrinks in response to temperature. However-, because the expansion or shrinkage is absorbed by the deflection of the claw-shaped members 5, the claw-shaped members 5 always contact the window 2. Accordingly, interruption in the upward and downward movements of the window 2, even at low temperatures or high temperatures, is avoided.

Figure 2:
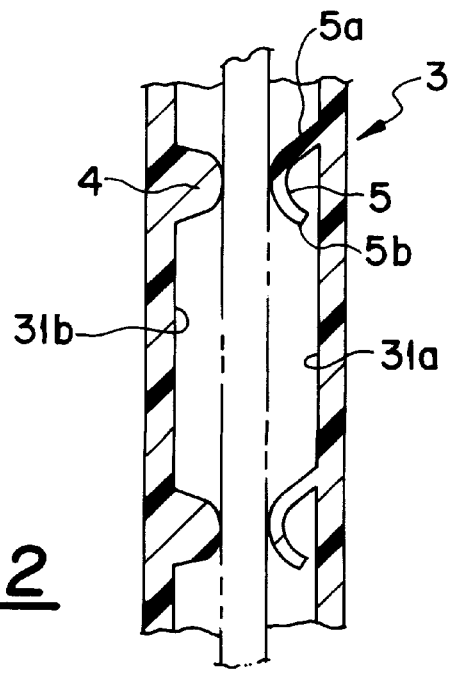
FIG. 2 is a sectioned longitudinal view of the essential part of a guide structure of a window according to a second embodiment of the present invention.

While the claw-shaped members 5 on both sides have been disposed alternately in the illustrated example, they may be disposed in opposing manner. In addition, as shown in FIG. 2, the claw-shaped members 5 may be formed only on a first inner opposed surface 31*a*, and protrusions 4 may be formed on the second inner opposed surface 31*b* as in prior art. As shown in FIG. 2, the claw-shaped members 5 have a proximal end 5*a* connected to the first inner surface 31*a* and a distal end Sb facing away from the second surface 31*b* and laterally spaced inwardly from the first surface 31*a*.

FIGS. 3A and 3B show a third embodiment of the present invention. On the inner opposing surfaces 31 of the sash 3 there are formed contact members in the form of claw-shaped members 6, each provided with a small-sized protrusion 7.

The main body portion of the claw-shaped member 6 is formed into a letter C shape or a letter L shape, and the proximal end is coupled integrally, i.e., monolithically to the upper end portion of the surface 31 and extends toward the bottom surface 32 and the distal end is laterally spaced inwardly from the surface 31. On the center of the upper surface of the main body portion, there is formed a thin protrusion 7 which forms a circular arc-shaped protruding surface in the width direction of the main body portion, that is, in the longitudinal direction of the sash 3. In the illustrated example, the claw-shaped members 6 on both sides are alternately disposed in an offset manner; however, the claw-shaped members 6 may also be disposed at opposed positions. Reference numeral 60 denotes a hole which is used for removing a sliding pin from the sash when the sash is injection-molded.

The claw-shaped member 5 can have a cross section other than the C-shaped cross-section shown in FIG. 2 or the L-shaped cross-section shown in FIG. 3. For example, a claw-shaped member 5A having a triangular cross-section as shown in FIG. 4A according to a fourth embodiment and a claw-shaped member 5B having a trapezoidal cross-section as shown in FIG. 4B according to a fifth embodiment can be used.

With the aforementioned structure, thermal expansion or contraction can be absorbed in the aforementioned way by the flexible property of the claw-shaped protrusion 6. In addition, the formation of the small protrusion 7 makes the contact area between the protrusion and the surface of the window 2 small, thereby reducing the sliding friction of the window when it ascends or descends.

In accordance with the aforementioned structure, the window guiding surface of the synthetic resin sash can contact with the window surface, while the sliding property of the window is maintained independent of the thermal expansion and shrinkage of the sash. As a result, rattling of the window can be prevented.

Figure 5:
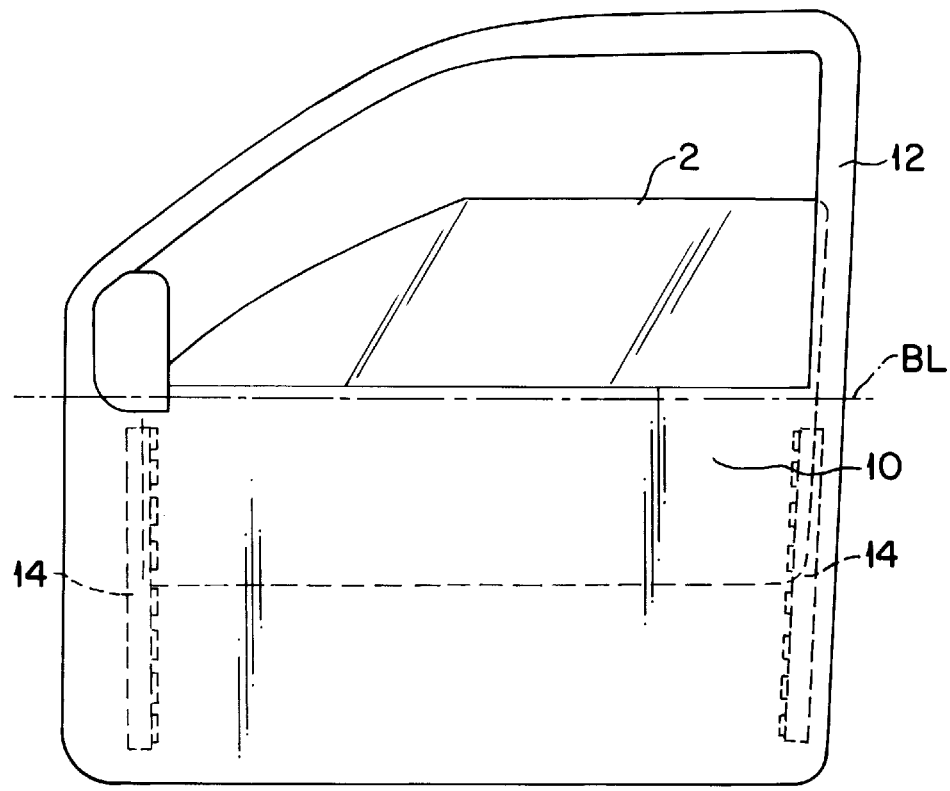
FIG. 5 is a side elevation view of an automobile door where a sash structure according to the present invention is employed.

An automobile door provided with a window guide structure according to sixth and seventh embodiments of the present invention will be described with reference to FIG. 5. FIG. 5 is a side elevation view of the automobile door. In the figure, an automobile door panel 10 is provided with a sash consisting of an upper sash 12 and lower sashes 14. The upper sash 12 is disposed above a belt line BL and has a window run (not shown) mounted thereon for enhancing the sliding and sealing properties between the sash and a window 2. Also, the lower sashes 14 are fixed to respectively inner surfaces of the front and rear ends of the door panel 10 located lower than the belt line BL.

Figure 6:
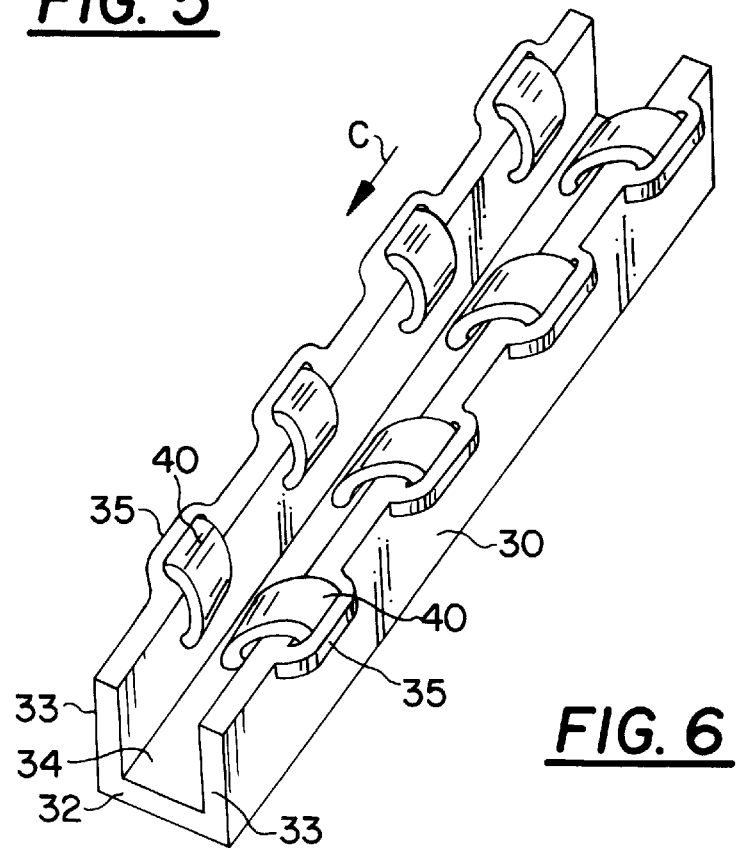
FIG. 6 is a perspective view of a window guide structure according to a sixth embodiment of the present invention.

FIG. 6 is a perspective view showing the lower sash 14 of a sixth embodiment. The lower sash 14 is provided with a lower sash main body 30 and a plurality of guide pieces 40 mounted in the lower sash main body 30 as sliding members. The main body 30 of the lower sash is fixed to the door panel 10 through an attaching portion (not shown).

The lower sash main body 30 is constituted by a long frame in the form of a U-shaped cross-section molded by resin injection molding. The main body 30 is provided with a base portion 32 which is a bottom wall portion and side wall portions 33 extending upright from opposite sides of the base portion 32. The base portion 32 and the side wall portions 33 form a groove 34 along which the window 2 slides. The resin selected to make the main body 30 of the lower sash may be any material, as long as the resin has strength enough to support the sliding motion of the window 2. For example, polypropylene (PP) or polyamide (PA) having strong strength enhanced by glass fibers can be employed.

Figure 7:
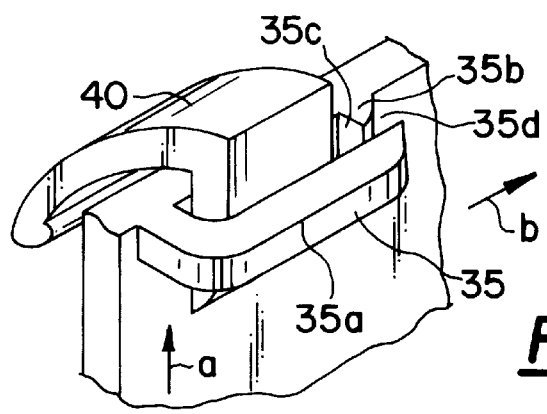
FIG. 7 is a perspective view showing the state where the guide piece is mounted in the mounting portion of the main body of the guide structure of FIG. 6.
Figure 8:
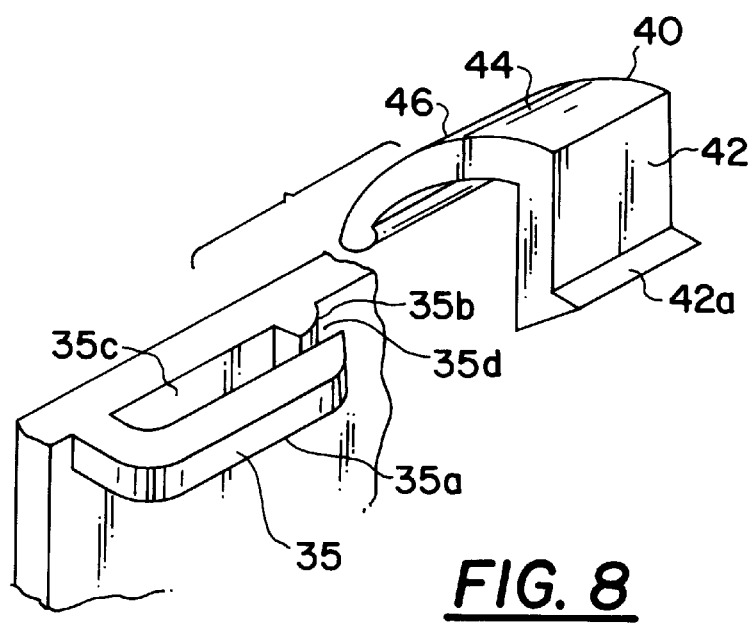
FIG. 8 is a perspective view of the guide structure in the state before it is assembled as shown in FIG. 7.

On both outer sides of the side wall portions 33 of the lower sash main body 30 a plurality of mounting portions 35 are formed at approximately equal intervals. The mounting portions 35 are preferably symmetrical in shape. FIG. 7 is a perspective view showing the state where the guide piece 40 is mounted in the mounting portion 35. FIG. 8 is a perspective view showing the state before the guide piece 40 is mounted in the mounting portion 35.

Each mounting portion 35 is provided with a hold arm portion 35*a* and an antislip-out protrusion 35*b* protruding from the outer surface of the side wall portion 33. The hold arm portion 35*a* is held in a cantilevered state where one end is fixed to the side surface of the side wall portion 33 and the other end is a free end. The space, enclosed by the inner side of the hold arm portion 35a and the side wall portion 33, is used as a mounting space 35c for holding the guide piece 40. Also, the space between the free end of the hold arm portion 35a and the antislip-out protrusion 35b is used as an insertion space 35d through which the guide piece 40 is inserted.

The aforementioned guide pieces or contact members 40 are mounted in a plurality of mounting portions 35, respectively, and guides the window 2 so that the window 2 can smoothly slide. The guide pieces 40 preferably have the same cross-section. Further, these injection-molded guide pieces are at a predetermined length.

The guide piece 40 is provided with an attaching base 42 and a lip portion 44 formed integrally with the attaching base 42. The attaching base 42 is sized to the width of the mounting space 35c, and on one end thereof an antislip-out portion 42a is formed. The antislip-out portion 42a is brought into contact with the lower surface of the hold arm portion 35a so that the guide portion 40 is prevented from slipping out in a direction indicated by an arrow "a" (FIG. 7).

Figure 9:
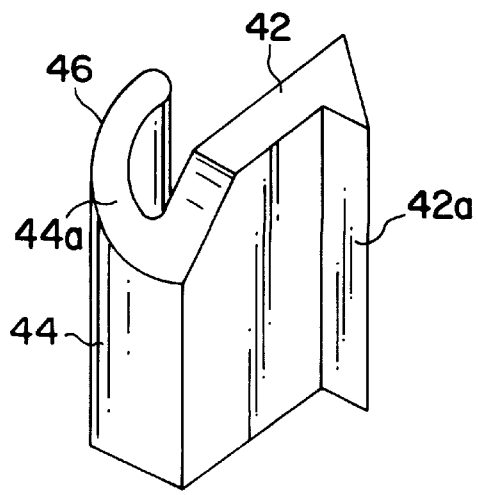
FIG. 9 is a perspective view of the guide piece of the guide structure shown in FIG. 6.

The lip portion 44 is disposed directed toward the center of the window sliding groove 34 along which the window 2 slides. The part of the lip portion 44 which is in contact with the window 2 is coated with a surface smoothing material 46 for enhancing the sliding property between the lip portion and the window 2. As the surface smoothing material 46, urethane or silicon can be employed. Implanted fibers may be used instead of the surface smoothing material 46, if they serve as a means of enhancing the sliding property between the lip portion 44 and the window 2. Furthermore, as shown in FIG. 9, a taper portion 44a is formed on the upper end surface of the lip portion 44 by cutting an injection molding at a predetermined length and then cutting the upper end surface of the lip portion 44 in a post process. This taper portion 44a is used for preventing detachment of the guide piece 40 when the guide piece makes contact with the lower end portion of the window 2. Material that is generally used as a weather strip, that is, rubber or soft resin can be employed as material of the guide piece 40. For instance, ethylene propylene diene ternary-system rubber (EPDM) can be applied.

When the guide piece 40 is mounted in the mounting portion 35 of the lower sash main body 30, the insertion space 35d between the free end of the hold arm portion 35a and the antislip-out protrusion 35b of the mounting portion 35 is expanded, and then the attaching base 42 is pushed in through the expanded insertion space 35d. With this operation, the attaching base 42 of the guide piece 40 is clamped in the mounting space 35c of the mounting portion 35 by the hold arm portion 35a. At this time, the antislip-out portion 42a of the guide piece 40 is brought into contact with the lower surface of the hold arm portion 35a, thereby preventing the guide piece 40 from slipping out in the direction indicated by an arrow a. In addition, a slip in an arrow-indicated direction b is prevented due to the narrow insertion space 35d between the hold arm portion 35a and the antislip-out protrusion 35b.

The lower sash structures of the aforementioned embodiments provide the following advantages:

(1) Because the door window 2 ascends or descends while the window 2 is being guided by the guide pieces 40 mounted in the lower sash main body 30, the window 2 itself does not make contact with the inner wall surface of the lower sash main body 30. Therefore, no sound is generated when the window 2 ascends or descends.

(2) The guide pieces 40 are firmly supported so as to clamp the window 2. Therefore, even while travelling in a bad condition, such as bumpy roads, the window 2 does not vibrate so as to make contact with the lower sash main body 30. Accordingly, no accompanying noise will occur.

(3) The guide pieces 40 are not provided over the overall length of the lower sash main body 30 but are mounted only at regions necessary for supporting the ascent and descent of the window 2. Therefore, the quantity of material such as rubber can be reduced as compared to a sealing member of the prior art that is provided over the entire length. Partial disposal of the guide pieces 40 will not cause any problems on a sealing operation, because the main body 30 of the lower sash is disposed inside the door panel 10 and is not exposed to the outside of the automobile.

(4) If the attaching base 42 of the guide piece 40 is pushed into the mounting space 35c of the mounting portion 35, the attaching base 42 will be clamped by the hold arm portion 35a. Therefore, the operation of mounting the guide pieces 40 in the lower sash main body 30 does not require an adhesive or caulking as utilized in the prior art and, in addition, attaching operability is facilitated. Particularly, when EPDM rubber with a poor adhesive property is employed as material of the guide piece 40, there is no need for taking adhesive property into consideration, so that an ability to mount the guide pieces in the lower sash main body 30 can be enhanced.

Figure 10A:
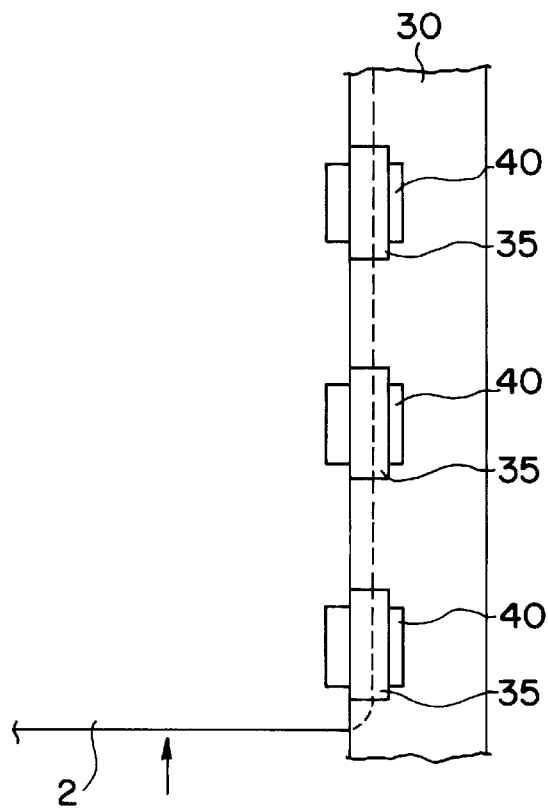
FIGS. 10A and 10B are diagrams used for explaining how an automobile door window is operated when the window ascends or descends, FIG. 10A showing how the window ascends from its descended position and FIG. 10B showing how the window descends from its ascended position.
Figure 10B:
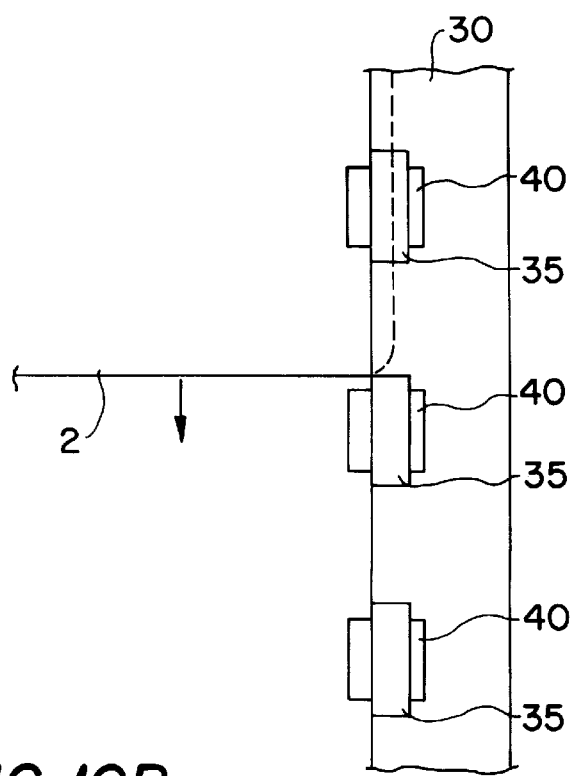

(5) The window 2 moves between its descended position and its ascended position as shown in FIGS. 10A and 10B. In FIG. 10A, when the window 2 ascends from the descended position, the guide pieces 40 do not undergo a detaching force from the window 2, because the guide pieces 40 are in contact with the window 2 at all times. However, when the window 2 descends from the ascended position, as shown in FIG. 10B, the lower end of the window 2 strikes against the upper end portion of the guide piece 40 and is subject to a great detaching force. However, in the embodiments of the present invention, the guide piece 40 does not undergo a great detaching force from the lower sash main body 30, because the upper end portion of the guide piece 40 is formed into a tapered portion 44a, as shown in FIG. 9.

(6) Because, as shown in FIG. 6, the insertion space 35d of the hold arm portion 35a is directed upwardly, the guide piece 40 is firmly held by the mounting portion 35. Therefore, even if the guide piece 40 underwent a detaching force (in a direction indicated by an arrow C) from the window 2, there would be no possibility of the guide piece 40 detaching from the lower sash main body 30.

FIGS. 11A and 11B are diagrams used for explaining a variation of the guide piece 40B according to the aforementioned embodiment. As shown in FIG. 11A, an extrusion molding B is obliquely cut into guide pieces 40B each having a predetermined length. With an obliquely cutting method, a taper portion 44Ba for preventing detachment is formed at the same time as the cutting of the extrusion molding B. Therefore, the post processing for forming the taper portion 44Ba after the cutting of the extrusion molding as in the aforementioned embodiment becomes unnecessary.

FIG. 12 is a perspective view used for explaining a variation of the lower sash main body 30C. As shown in the figure, the mounting portion 35C of the lower sash main body 30C is formed by a looped hold arm portion 35Ca having a mounting space 35Cc. The mounting space 35Cc is formed to approximately the same size as the attaching base 42C of the guide piece 40C. When the guide piece 40C is mounted, the attaching base 42C is elastically deformed and pushed into the mounting space 35Cc. With this operation, the attaching base 42C is held with the hold arm portion 35Ca. In this variation, as compared with the embodiment of FIG. 8, the holding force of the guide piece 40C can be further enhanced, because there is no insertion space 35d.

Figure 13:
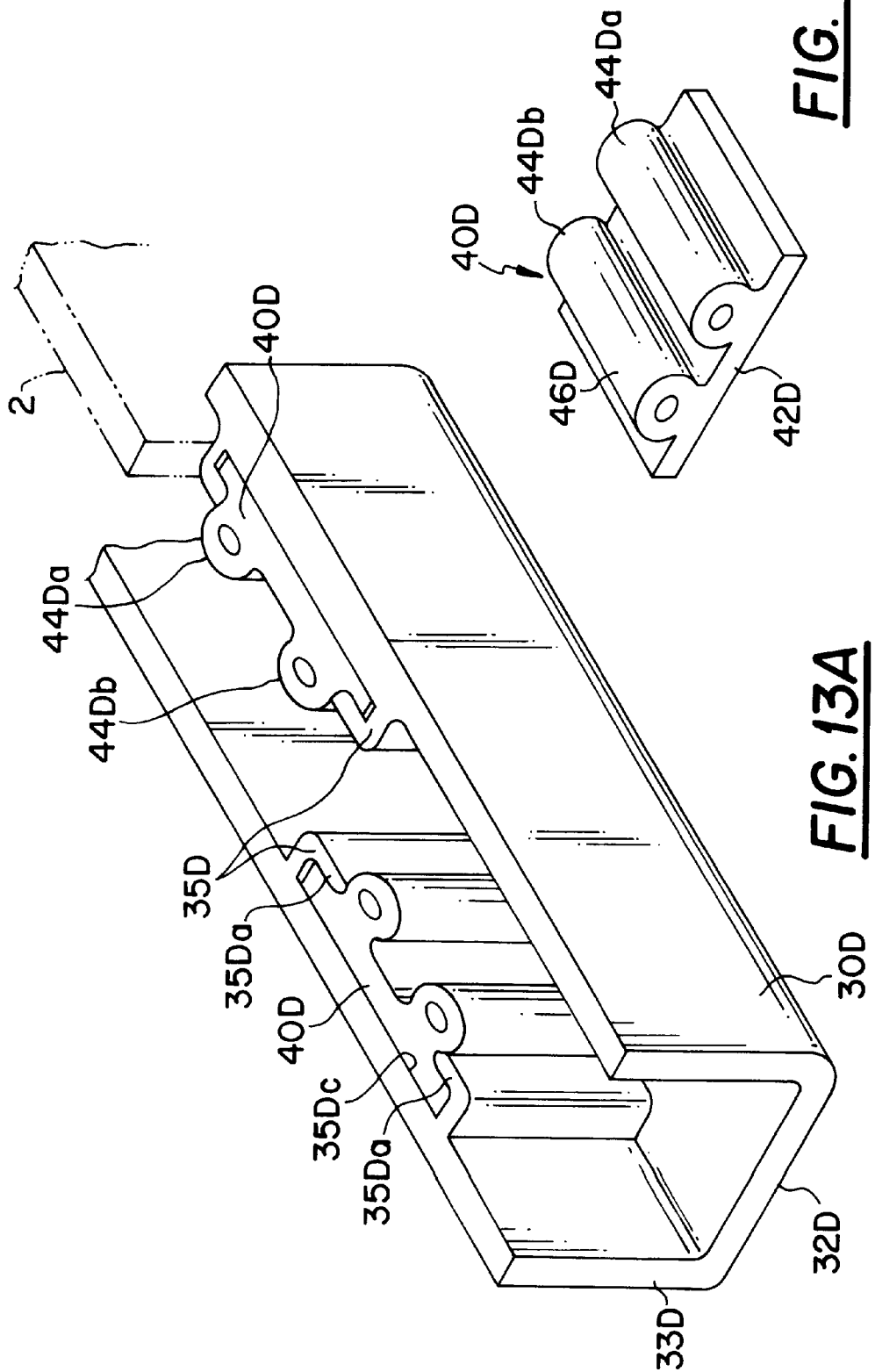
FIGS. 13A and 13B are perspective views of a guide structure according to a seventh embodiment of the present invention.

FIGS. 13A and 13B are perspective views showing a seventh embodiment of the present invention. As shown in the figures, a lower sash main body 30D is provided with a base portion 32D, side wall portions 33D, and mounting portions 35D protruded inwardly from both side wall portions 33D. The mounting portion 35D is provided with L-shaped mounting protrusions 35Da in the form of a rail. Between the mounting protrusions a mounting space 35Dc is formed.

Guide pieces 40D are members with the same sectional area formed by cutting at a predetermined length an extrusion molding formed from rubber or soft resin. The guide piece 40D, as shown in FIG. 13B, is provided with a plate-shaped attaching base portion 42D which is mounted in the mounting space 35Dc and first and second hollow portions 44Da and 44Db protruded from the attaching base portion 42D. The first and second hollow portions 44Da and 44Db are coated on the top faces with surface smoothing materials 46D for enhancing sliding property with respect to the window 2.

The guide piece 40D is mounted in the lower sash main body 30D merely by sliding the attaching base portion 42D of the guide piece 40D into the mounting space 35Dc from the top of the illustration. Therefore, the mounting operation becomes easier.

In addition, with respect to both of the ascent and descent of the window 2, the first and second hollow portions 44Da and 44Db do not undergo a great force, such when detaching the guide piece 40D, because the cross-section of each is formed into a flat cylindrical shape. Therefore, the guide piece 40D is excellent in attaching property, because it does not need to be held by the mounting portion 35D with strong force such as press fitting.

Furthermore, a single guide piece 40D guides the window 2 using a plurality of first and second hollow portions 44Da and 44Db for each guide piece 40D, so that the number of guide pieces 40D can be reduced.

Also, the first and second hollow portions 44Da and 44Db can enhance performance to support the window 2, because the contact area between the hollow portions and the window 2 becomes larger by forming the cross-section into a flat shape.

Figure 18A:
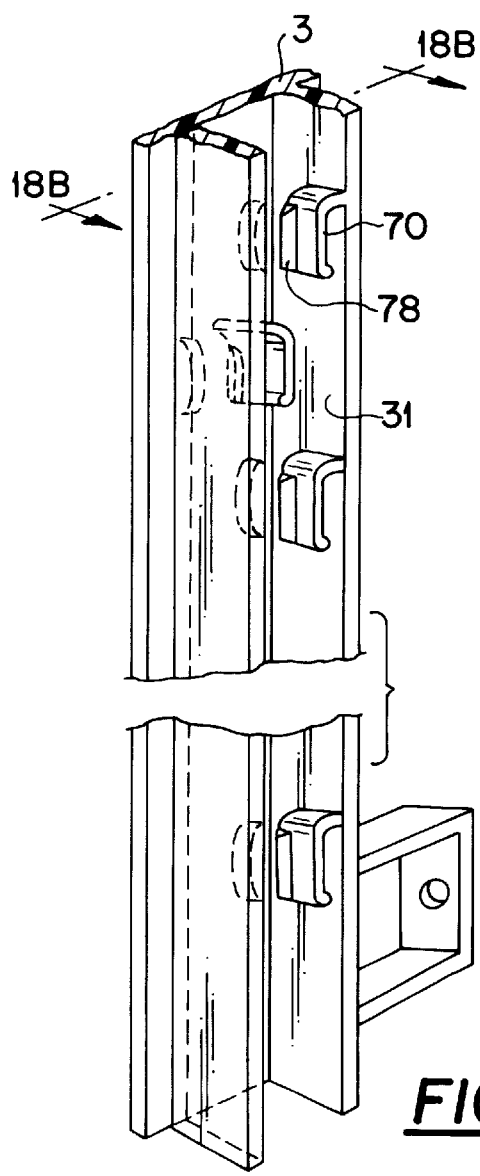
FIG. 18A is a perspective view of a window guide structure for an automobile door window according to an eighth embodiment of the present invention.

FIGS. 18A, 18B, 18C and 18D show an eighth embodiment of the present invention. As shown in FIG. 18A, contact members 70 comprising a synthetic resin and having substantially C-shaped, or substantially L-shaped, cross-sections are provided on the inner surface 31 of the sash 3. Similar to several of the other embodiments, each contact member 70 comprises a proximal end 72 integrally coupled to the inner surface 31, a distal end 74 that is laterally spaced inwardly from its associated side wall, and a lip portion 76 extending therebetween.

Figure 18B:
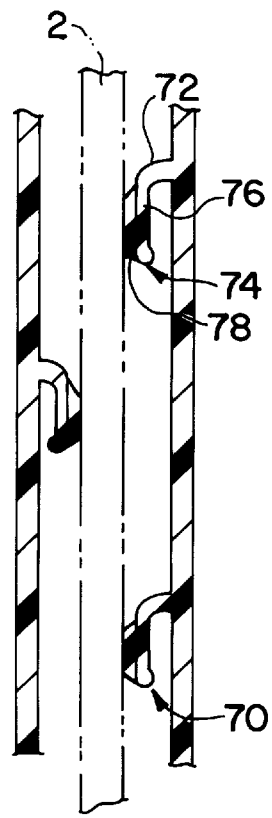
FIG. 18B is a sectioned longitudinal view taken substantially along line 18B—18B of FIG. 18A.
Figure 18D:
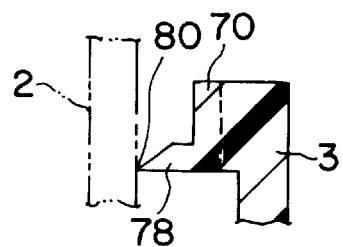
FIG. 18D is a sectioned view taken substantially along line 18D—18D of FIG. 18C.
Figure 18C:
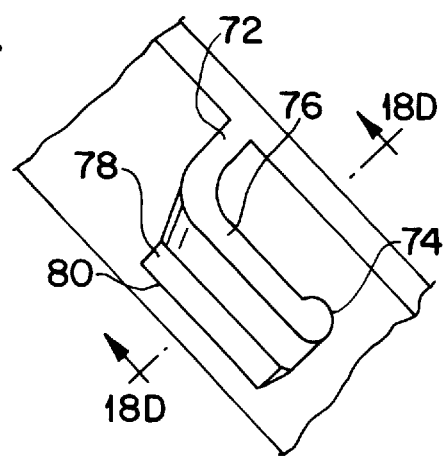
FIG. 18C is an enlarged perspective view of one of the contact members shown in FIG. 18A.

This embodiment also provides smaller size protrusions 78 extending from the contact members 70 into the guide channel. More specifically, these protrusions 78 are formed as a substantially linear edge of reduced thickness (compared to the contact members 70) along the exposed outer surface of the lip portion 76 ending adjacent the distal end 74, as depicted in FIG. 18C. The linear edges 80 can extend in the direction of window movement or at some angle thereto so as to minimize surface contact. When the window 2 is moved in the guide channel, the protrusions 78 with reduced thickness, flexibly contact and guide the window 2 as illustrated in FIGS. 18B and 18D. Because of the linear edge, the contact area between the window and the contact members is reduced.

Similar to the previously described embodiments, the flexibility of the contact members absorbs or accommodates any thermal expansion or contraction of the sash, thus keeping contact member 70 in contact with the window, thereby preventing rattling of the door window 2 due to thermal expansion or shrinkage of the sash. In addition, like the third embodiment, the reduction of the contact area between the window 2 and the contact member 70 due to the linear edge protrusions 78 reduces the sliding friction of the window 2 when the window 2 moves in the guide channel.

While the invention has been described with reference to preferred embodiments thereof, the invention is not to be limited to the details given herein, but may be modified within the scope of the appended claims. For example, the following modifications are also possible.

(1) Various kinds of structures can be adopted as a structure of the mounting portion which attaches guide pieces to the main body of a lower sash. For example, the mounting portion 35D, shown in FIGS. 13A and 13B, may be disposed on the outside side of the lower sash main body 30.

(2) The guide pieces which are mounted to the lower sash main body are not limited particularly in number and disposition, as long as they do not interfere with guidance of the window. For example, they may be alternately disposed.

What is claimed is:

1. A window guide comprising:

a body mountable in an automobile door, said body comprising a synthetic resin and including a base wall and opposing first and second side walls, each of said side walls forming a continuous wall surface, said opposing first and second side walls being laterally spaced from one another, said base wall and said opposing first and second side walls collectively forming a guide channel with a substantially U-shaped cross section, said guide channel being constructed and arranged for permitting movement of an edge of an automobile door window in said guide channel along a lengthwise direction of said base wall so that the edge faces said base wall as the automobile door window moves in said guide channel; and first and second pluralities of contact members respectively monolithically formed with and extending from said first and second side walls inwardly into said guide channel, each of said contact members of at least said first plurality of contact members having a respective proximal end connected to said first side wall and a respective distal end facing away from said second side wall yet laterally spaced inwardly from said first side wall to define a gap between said distal end and said first side wall so as to permit movement of said distal end in said gap towards and away from said first side wall, said contact members of said first and second pluralities being positioned for contacting and guiding movement of the automobile door window in said guide channel.

2. The window guide of claim 1, wherein said contact members associated with said first side wall are uniformly spaced from one another, wherein said contact members associated with said second side wall are uniformly spaced from one another, and wherein said contact members associated with said first side wall are vertically offset from said contact members of said second side wall.

3. The window guide of claim 1, wherein each of said contact members of said first plurality comprises said synthetic resin and has a substantially C-shaped cross section with a respective lip portion positioned between said respective proximal and distal ends, each of said lip portions being constructed and arranged for guiding movement of the automobile door window in said guide channel.

4. The window guide of claim 3, wherein each of said contact members of said second plurality of contact members comprises said synthetic resin and has said substantially C-shaped cross section with a respective proximal end connected with said second side wall, a respective distal end laterally spaced from said second side wall, and a respective lip portion extending between said respective proximal and distal ends.

5. The window guide of claim 4, wherein each of said lip portions has one of a triangular and a trapezoidal shaped cross section.

6. The window guide of claim 4, wherein said contact members associated with said first side wall are uniformly spaced from one another, wherein said contact members associated with said second side wall are uniformly spaced from one another, and wherein said contact members associated with said first side wall are vertically offset from said contact members of said second side wall.

7. The window guide of claim 4, wherein each of said lip portions comprises a protrusion extending into said guide channel.

8. The window guide of claim 7, wherein for said contact members of said first and second pluralities located at a lower portion of said body, said protrusions have respective substantially linear edges for contacting and guiding movement of the automobile door window in said guide channel.

9. The window guide of claim 3, wherein each of said contact members of said second plurality comprises a solid protrusion, and wherein said lip portions of said first plurality of contact members and said solid protrusions are constructed and arranged for guiding movement of the automobile door window in said guide channel.

10. The window guide of claim 3, wherein each of said lip portions has one of a triangular and a trapezoidal shaped cross section.

11. The window guide of claim 3, wherein each of said lip portions comprises a protrusion extending into said guide channel.

12. The window guide of claim 11, wherein for said contact members of said first plurality located at a lower portion of said body, said protrusions have respective substantially linear edges for contacting and guiding movement of the automobile door window in said guide channel.

13. The window guide of claim 1, wherein each of said contact members of at least said first plurality further has respective inner and outer surfaces extending between said proximal and distal ends with said inner surface having a portion facing towards and parallel with said first side wall and said outer surface having a portion positioned for guiding the automobile door window in said guide channel.

14. The window guide of claim 1, wherein said contact members of said first and second pluralities are flexibly connected to said body to permit flexible movement of the contact members towards said side walls and positioned for contacting and guiding movement of the automobile door window in said guide channel.

15. A window guide comprising:
a body mountable in an automobile door, said body comprising a synthetic resin and including a base wall and opposing first and second side walls, said opposing first and second side walls being laterally spaced from one another, said base wall and opposing first and second side walls collectively forming a guide channel with a substantially U-shaped cross section, said guide channel being constructed and arranged for permitting movement of an edge of an automobile door window in said guide channel along a lengthwise direction of said base wall so that the edge faces said base wall as the automobile door window moves in said guide channel, said opposing first and second side walls having respective first and second pluralities of mounting portions; and first and second pluralities of contact members respectively associated with and detachably mountable to said first and second mounting portions so as to extend from said opposing first and second side walls downwardly and inwardly into said guide channel, each of said contact members of at least said first plurality of contact members having a respective proximal end detachably mountable to said first side wall and a respective distal end facing away from said second side wall yet laterally spaced inwardly from said first side wall to define a gap between said distal end and said first side wall so that said member is flexibly connected to said body to permit movement of said distal end along said gap and towards said first side wall, said contact members of said first and second pluralities being positioned for contacting and guiding movement of the automobile door window in said guide channel.

16. The window guide of claim 15, wherein said contact members associated with said first side wall are uniformly spaced from one another, wherein said contact members associated with said second side wall are uniformly spaced from one another, and wherein said contact members associated with said first side wall are offset from said contact members of said second side wall.

17. The window guide of claim 15, wherein each of said contact members of said first plurality comprises one of a rubber and a soft resin and has a substantially C-shaped cross section with a respective lip portion extending between said respective proximal and distal ends, said lip portions being constructed and arranged for guiding movement of the automobile door window in said guide channel.

18. The window guide of claim 17, wherein said contact members of said first plurality located at a lower portion of said body have respective edges for contacting and guiding movement of the automobile door window in said guide channel.

19. The window guide of claim 15, wherein each of said contact members of said second plurality comprises one of a rubber and a soft resin and has a substantially C-shaped cross section with a respective proximal end detachably mountable to said second side wall, a respective distal end laterally spaced from said second side wall, and a respective lip portion extending between said respective proximal and distal ends, said contact members of said first and second pluralities being flexibly connected to said body to permit flexible movement of the contact members towards said side walls and positioned for contacting and guiding movement of the automobile door window in said guide channel.

20. The window guide of claim 19, wherein each of said contact members positioned at an uppermost location of said body further has a tapered surface so as to facilitate entry of the automobile door window into said guide channel.

21. The window guide of claim 15, wherein each of said contact members of at least said first plurality further has respective inner and outer surfaces extending between said proximal and distal ends, said inner surface having a portion facing towards and parallel with said first side wall and said outer surface having a portion positioned for guiding the automobile door window in said guide channel.

* * * * *